Dec. 5, 1961     F. P. CRONHOLM     3,011,362
FISHING REEL CRANK

Filed May 26, 1959     2 Sheets-Sheet 1

FREDERICK P. CRONHOLM
INVENTOR.

BY
ATTORNEY

Dec. 5, 1961    F. P. CRONHOLM    3,011,362
FISHING REEL CRANK

Filed May 26, 1959    2 Sheets-Sheet 2

FREDERICK P. CRONHOLM
INVENTOR.

BY
ATTORNEY

United States Patent Office 3,011,362
Patented Dec. 5, 1961

3,011,362
FISHING REEL CRANK
Frederick P. Cronholm, Lakewood, Calif., assignor to R-D Manufacturing Corp., a corporation of California
Filed May 26, 1959, Ser. No. 815,912
11 Claims. (Cl. 74—546)

This invention relates to fishing reels and more particularly to a new and improved adjustable crank for use in conjunction with a fishing reel.

Fishing reel cranks in the prior art are generally one length for a particular reel. By using a crank of one length, the only way of varying the amount of torque applied to the reel is to vary the force applied to the crank. Under this type of operation a point is soon reached where the fisherman cannot apply additional force to the crank, either because of the physical limitation of the fisherman or the possibility of damaging the crank.

Under some conditions of operation it becomes desirable to apply additional torque to the reel beyond that capable with the standard fixed length crank. In the prior art this could be done only by removing the crank from the reel and replacing it with a longer one. Such a procedure could not, of course, be carried out during the time the reel is in actual use by the fisherman.

Accordingly, it is an object of the present invention to provide a crank for fishing reels which has two positions of operation for applying variable torque to a fishing reel.

It is another object of the present invention to provide a two position crank for a fishing reel which is simple in operation and rugged in construction.

It is another object of the present invention to provide a crank for a fishing reel which has two positions and which positively drives the fishing reel in each of the two positions.

It is a further object of the present invention to provide a two position crank for fishing reels which may be readily changed from one position to the other while the crank is in use.

In accordance with the present invention a crank is provided for use in combination with fishing reels which is capable of applying a variable torque to a fishing reel while applying a relatively constant force to the crank. The crank has two positions. In one of the positions the length of the crank is increased beyond that which is normally used on fishing reels. In the other position the crank is approximately the length that is normally used in the present fishing reel art. The crank is adapted to be readily moved from one position to the other by manipulation of the crank. This may be quickly accomplished while the reel and crank are being used. By using the crank in its extended position, a greater torque may be applied to the reel than in its shortened position when applying the same force.

According to one particular configuration of a crank in accordance with the present invention, the crank is provided in two parts which are interconnected and adapted to rotate relative to each other between first and second positions. The two parts of the crank each have a pair of bearing surfaces. In the first or extended position, the two parts of the crank are held so that one set of the bearing surfaces thereof are in contact. The two parts are retained in this position by a tension spring. If it becomes desirable to place the crank in its second or shortened position, it is rotated in the direction opposite that from normal use. By this counter rotation and the force of the spring under tension, the two parts are moved relative to each other quite rapidly into the second position. In the second position the other set of bearing surfaces are in contact. The crank is retained in its second position by an interlocking notch and tooth and the tension of the spring.

A better understanding of the invention may be had from a reading of the following detailed description and an inspection of the drawings, in which.

In each of the views illustrated in the drawing, identical reference numerals are utilized for the same parts.

Figure 1:
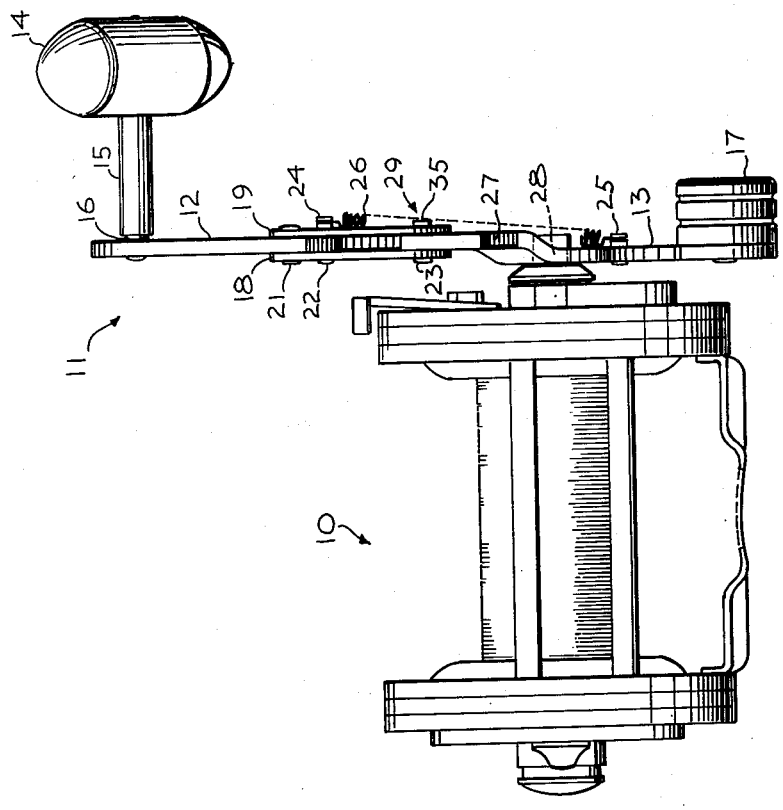
FIG. 1 is an elevational view of a fishing reel crank attached to a fishing reel in accordance with the present invention.

Referring now to the drawing and more particularly to FIG. 1 thereof, a fishing reel crank in accordance with the present invention is illustrated generally at 11 attached to a fishing reel 10. The fishing reel crank 11 includes a first arm 12 and a second arm 13. Connected to the first arm 12 is a handle 14. The handle is connected through the utilization of a sleeve 15 which fits over spindle 16. Spindle 16 in turn is rigidly attached, as by means of a rivet, to the first arm 12. The handle 14 in conjunction with the sleeve 15 and the spindle 16 operate in such a manner as to permit continuous rotation of the handle 14 in either direction during the time that the crank is in operation, as is well known in the prior art.

Connected to the second arm 13 is a counterbalance weight 17 which is permanently affixed thereto as by means of a rivet. Arms 12 and 13 are interconnected by cover plates 18 and 19 which together form a yoke. Cover plates 18 and 19 are rigidly affixed to the first arm 12 as by means of rivets 21 and 22. The second arm 13 is supported between the cover plates 18 and 19 by a pin 29 to permit relative rotation between the arms 12 and 13. The end portions 23 and 35 of the pin 29 are riveted to retain cover plates 18 and 19 in place. The pin 29 is constructed in such a manner as to provide a spacing between the interior surfaces of the cover plates 18 and 19 which is somewhat larger than the thickness of the arm 13. The detailed construction of the pin 29 and its use is described below.

As is illustrated in FIG. 1, the rivet 22 includes an extension 24 which is adapted to retain one end portion of a spring 26 and may, therefore, be described as a spring anchor post. An additional spring anchor post 25 is rigidly attached to the second arm 13 by means of a rivet. Spring 26 is then interconnected between the spring anchor posts 24 and 25 as illustrated throughout the various figures. The operation of the spring 26 will be fully described below. A notch 27 is provided in the second arm 13 as well as an opening 28.

Figure 2:
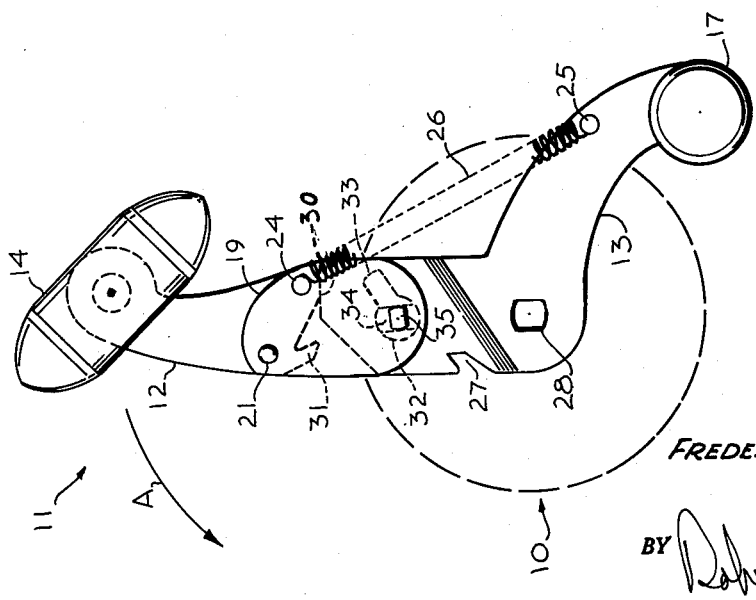
FIG. 2 is a side elevational view of a fishing reel crank in accordance with the present invention.

Referring now to FIG. 2, a side elevation of the fishing reel crank of FIG. 1 is illustrated with the configuration of the arms 12 and 13 beneath the cover plate 19 being illustrated in phantom. As illustrated in FIG. 1, the opening 28 provided through the second arm 13 is utilized to connect the crank 11 to a reel shaft. The opening 28 may be of any particular configuration necessary to fit the shape of the shaft of the reel being utilized. The notch 27 in the second arm 13 may be seen in FIG. 2. A tooth 31 is provided as a portion of the first arm 12 and, as will be seen, the notch 27 and the tooth 31 are constructed so that they may be engaged with each other. Also provided as a part of the second arm 13 is a circular opening 32 having a slot 33 extending from the surface thereof. The pin 29 of FIG. 1 which extends through the cover plates 18 and 19 and the interspersed second arm 13 fits within the circular opening 32. The details of pin 29 may be more clearly seen by referring to FIG. 5. The pin 29 includes a central portion 34 having opposed curved surfaces 41 and 42 and opposed flat surfaces 43 and 44. The opposed flat surfaces 43 and 44 of the pin 29 are adapted to fit within the slot 33 extending from the circular opening 32. The opposed curved surfaces 41 and 42 of the pin 29 are of such a diameter as to mate with the circular portion of the opening 32. The protrusions 23 and 35 extend through openings provided in the cover plates 18 and 19 and after final assembly are riveted in order to retain the cover plates 18 and 19 in place and to interconnect the arms 12 and 13.

FIG. 2 illustrates the crank in its extended position. In this position the bearing surfaces 37 and 36 of the arms 12 and 13, respectively (FIGS. 3 and 4), are in contact as illustrated at 30 in FIG. 2. In this position the tension of spring 26 retains the bearing surfaces of the arms 12 and 13 in abutting relationship.

In operation, a crank in accordance with the present invention which is affixed by means of the opening 28 to a reel stem of any particular reel is rotated in a clockwise direction. As the crank is rotated, the first arm 12 is urged against the second arm 13 at the point 30. The spring 26 also exerts a force tending to urge the arms 12 and 13 into contact at the point 30. By the combination of these two forces, the arms 12 and 13 are maintained in the position illustrated in FIG. 2. During operation in the extended position illustrated in FIG. 2, the spatial relationship between the pin 29, the opening 32 and the slot 33 remains as illustrated in FIG. 2. In its extended position, the reel crank presents greater leverage than that which is normally available. With the increased leverage, an increased amount of torque may be applied to a fishing reel when exerting the same or less force than would normally be exerted utilizing a standard reel crank. Since a greater torque is applied to a reel by the reel crank of the present invention, a greater load may be easily retrieved with less effort. Fishermen are, therefore, enabled to retrieve larger fish, particularly of the game type, with a reel crank of the present invention, while at the same time not having to exert the large amount of energy normally required in order to do so with the standard type of reel crank.

If a fisherman does not require the additional leverage which is available when the reel crank of the present invention is in its extended position, the crank may be readily moved to a shortened position which is approximately the same length and therefore the same leverage as that of a standard reel crank.

In order to place the reel crank of the present invention from its extended to its shortened position, the handle 14 as illustrated in FIG. 2 is rotated in a counter-clockwise direction as shown by the arrow "A." As the handle is rotated in a counter-clockwise direction, the tension of the spring 26 is increased momentarily until it passes beyond its fully extended position. Thereafter, the tension of the spring snaps the handle 14 and the first arm 12 from its extended position to its shortened position. A position intermediate the extended and shortened positions of the arms 12 and 13 is shown in FIG. 3, in which view the cover plate 19 is removed to illustrate the relationship between the arms 12 and 13.

Figure 3:
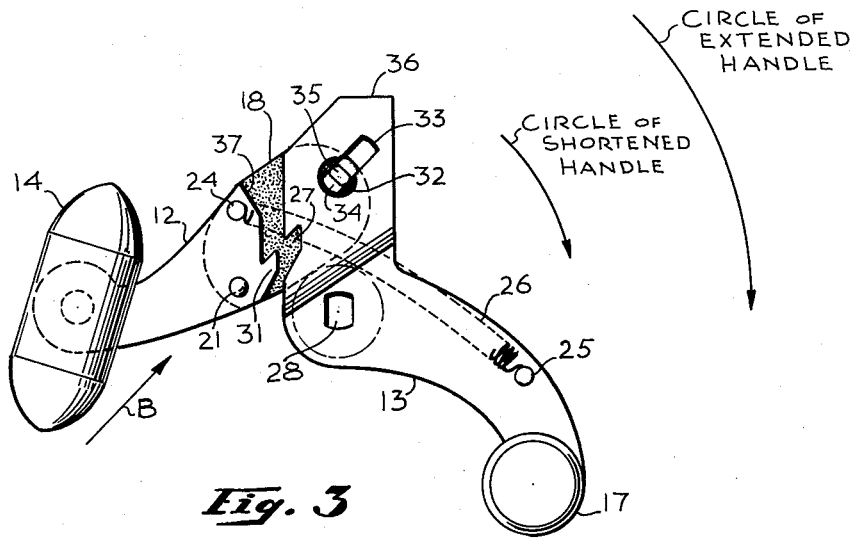
FIG. 3 is a side elevational view of the fishing reel crank of FIG. 1, partially disassembled, in an intermediate position between its extended and its shortened positions.

When the first arm 12 is in the position shown in FIG. 3 with respect to the second arm 13, the tooth 31 is aligned with the notch 27. At the same time, the opposed flat surfaces 43 and 44 of pin 29 are aligned with the slot 33 extending from the circular opening 32 in the frame member 13. In this position the first arm 12 is moved to the right and slightly upward, as illustrated by the arrow "B," to cause tooth 31 to engage notch 27. The opposed flat surfaces of pin 29 enter the slot 33 in the second arm 13. When the first arm 12 is thus engaged with the second arm 13, the shortened reel crank is as shown in FIG. 4, in which view the cover plate 19 is removed for purposes of illustration.

Figure 4:
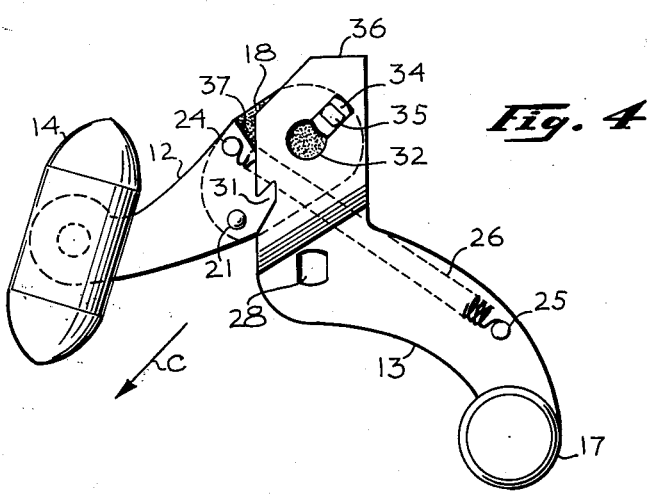
FIG. 4 is a side elevational view of the fishing reel crank of FIG. 1 partially disassembled in its shortened position.

In FIG. 4, the spring 26 maintains the lower surface portion of the tooth 31 in bearing contact with the lower surface portion of the notch 27 in the second arm 13. In operation, the reel crank in this shortened position is rotated in a clockwise direction. During clockwise rotation the upper surface portion of the tooth 31 engages the upper surface portion of the notch 27 and thereby locks the arms 12 and 13 in place. In this shortened position the reel crank of the present invention applies approximately the same leverage as would be applied by a standard reel crank. Light loads may, therefore, be retrieved by a reel utilizing the shortened reel crank while rotating the handle through a shortened arc.

If during the process of retrieving a fishing line while using the shortened reel crank as illustrated in FIG. 4, it becomes desirable to lengthen the reel crank, thereby permitting the application of additional torque to the reel, this may be accomplished readily. To place the reel crank in its extended position, a force is applied to the handle 14 in a left and slightly downward direction, as viewed in FIG. 4 and shown by arrow "C." The first arm 12 is disengaged from the second arm 13, thereby causing the tooth 31 to become disengaged from the notch 27 and the opposed flat surfaces of pin 29 to be removed from the slot 33. The relative positions of the arms 12 and 13 is shown in FIG. 3. Thereafter the handle 14 is rotated in a clockwise direction, causing the first arm 12 to be rotated about pin 29 (shown in FIG. 1) from the position illustrated in FIG. 3 to the position illustrated in FIG. 2. As this is accomplished, tension is applied by the spring 26 as the first arm 12 is rotated in the clockwise direction until it reaches its fully extended position at the top of the arc. After it passes over this position, the tension applied by the spring 26 causes the first arm 12 to snap into the fully extended position whereby surface portion 37 of the first arm 12 is in bearing contact with the surface portion 36 of the second arm 13 as illustrated at point 30 in FIG. 2.

Figure 5:
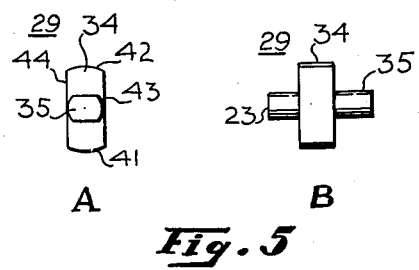
FIG. 5 is a detailed view of a part of the fishing reel crank as illustrated in FIGS. 1–4.

The pin 29 is illustrated in detail in FIG. 5. A top view thereof is shown at A and a side view at B. As illustrated the pin 29 includes an enlarged portion 34 having opposed curved surfaces 41 and 42 and opposed flat surfaces 43 and 44. The curved surfaces of pin 29 mate with the circular opening 32 in the second arm 13 during the time the crank is operated in its extended position. The curved surfaces 41 and 42 also rotate within the circular opening 32 during the time the reel crank is being shortened or extended. When the reel crank is placed in its shortened position so that the tooth 31 mates with the notch 27, the opposed flat surfaces 43 and 44 of the pin 29 are adapted to mate with the slot 33. In the side view B of FIG. 5, the pin 29 is illustrated as having a pair of protrusions 23 and 35 extending outwardly therefrom. The protrusion 23 is inserted through the cover plate 18 and is riveted on the outside thereof as illustrated in FIG. 1. The protrusion 35 extends through the cover plate 19 and is riveted on the outside thereof. The width of the enlarged portion 34 of the pin 29 as illustrated in FIG. 5-B is such as to keep the cover plates 18 and 19 spread apart slightly greater than the thickness of the second arm 13. This permits the second arm 13 to move easily between the cover plates 18 and 19 when the crank is being moved from one of its positions to the other.

There has been thus disclosed a crank for fishing reels which may be extended or shortened as desired to apply a variable amount of torque to fishing reel.

Although a particular crank for a fishing reel has been illustrated and described having unique features not heretofore known, it is not intended that the invention be limited to the specific structure illustrated. Accordingly, the invention should be given full scope of any modifications, variations and alternative arrangements falling within the scope of the annexed claims.

What is claimed is:

1. A two position fishing reel crank including the combination of first and second arms, first and second cover plates rigidly affixed to said first arm to form a yoke, said second arm being pivotally suspended between said cover plates, said first arm and said cover plates being rotatable relative to said second arm between first and second positions, a spring interconnecting said first and second arms for applying force to retain said arms in each of said positions, and locking means for securing said arms in said second position.

2. A two position fishing reel crank including the combination of first and second arms, first and second cover plates rigidly affixed to said first arm to form a yoke, said second arm being pivotally suspended between said cover plates, said first arm and said cover plates being rotatable relative to said second arm between first and second positions, a spring interconnecting said first and second arms for applying force to retain said arms in each of said positions, locking means for securing said arms in said second position, and means for aligning said arms in said second position to permit engaging said locking means.

3. A two position fishing reel crank including the combination of first and second arms, first and second cover plates rigidly affixed to said first arm, said second arm being pivotally suspended between said cover plates, said first arm and said cover plates being rotatable relative to said second arm between first and second positions, a spring interconnecting said first and second arms for retaining said first and second arms in a relatively rigid condition in each of said positions, a tooth protruding from said first arm, and said second arm defining a notch therein, said tooth and said notch being adapted to engage for locking said first and second arms in said second position.

4. A two position fishing reel crank including the combination of first and second arms, first and second cover plates rigidly affixed to said first arm, said second arm defining a substantially circular opening therethrough, said second arm defining a slot therein communicating with said circular opening, a pin extending between said cover plates and through said opening in said second arm, said first arm being rotatable with said pin between first and second positions, said pin being adapted to rotate within said circular opening in said first position and to mate with said slot in said second position, and locking means for retaining said first and second arms in said second position.

5. A two position fishing reel crank including the combination of first and second arms, first and second cover plates rigidly affixed to said first arm forming a yoke, said second arm being pivotally suspended between said cover plates, said first arm and said cover plates being rotatable relative to said second arm between first and second positions, a spring interconnecting said first and second arms for retaining said first and second arms in each of said positions, a tooth protruding from said first arm, said second arm defining a notch therein, said tooth and said notch being adapted to engage one another, and means for aligning said first and second arms in said second position to permit said tooth to engage said notch thereby locking said arms in said second position.

6. A two position fishing reel crank including the combination of first and second arms, first and second cover plates rigidly affixed to said first arm to form a yoke, said second arm defining an opening therethrough, a pin extending through each of said cover plates and through said opening in said second arm to suspend said second arm between said cover plates, said second arm being movable about said pin between first and second positions, said pin and said opening in said second arm being adapted to align said first and said second arms in said second position, and means for locking said arms in said second position.

7. A two position fishing reel crank including the combination of first and second arms, first and second cover plates rigidly affixed to said first arm, said second arm defining a circular opening therethrough, said second arm defining a slot therein communicating with said circular opening, a pin including a pair of opposed flat surfaces and a pair of opposed curved surfaces extending between said cover plates and through said opening in said second arm, said first arm being rotatable with said pin between first and second positions, said opposed curved surfaces of said pin being adapted to mate with said circular opening in said first position and said opposed flat surfaces being adapted to mate with said slot in said second position, and locking means for retaining said first and second arms in said second position.

8. A two position fishing reel crank including the combination of first and second arms, first and second cover plates rigidly affixed to said first arm, said second arm defining a circular opening therethrough, said second arm defining a slot therein communicating with said circular opening, a pin including a pair of opposed flat surfaces and a pair of opposed curved surfaces extending between said cover plates and through said opening in said second arm, said first arm being rotatable with said pin between first and second positions, said opposed curved surfaces of said pin being adapted to mate with said circular opening in said first position and said opposed flat surfaces being adapted to mate with said slot in said second position, a tooth protruding from said first arm, and said second arm defining a notch therein adapted to receive said tooth, said tooth and said notch being engaged in said second position to lock said arms in said second position.

9. A two position fishing reel crank comprising first and second arms, first and second cover plates rigidly affixed to said first arm to form a yoke, said second arm having an opening therein for fixedly engaging the shaft of an associated reel, means pivotally suspending said second arm between said cover plates, a crank handle attached to said first arm, single spring means interconnecting said first and second arms for holding said arms in a first position whereby the rotation of said crank defines a first radius of rotation for said handle and for holding said arms in a second position whereby the rotation of said crank defines a smaller radius of rotation for said handle, and means for locking said arms in said second position.

10. A two position fishing reel crank in accordance with claim 9 wherein said pivotally suspending means comprises a pin fixedly attached to said cover plates and having surfaces adapted to mate with a circular opening in said second arm when said arms are in said first position and with a slot in said second arm when said arms are in said second position.

11. A two position fishing reel crank in accordance with claim 9 wherein said locking means comprises a protruding tooth on said first arm and a mating notch in said second arm for engaging said tooth.

References Cited in the file of this patent

UNITED STATES PATENTS

| | | |
|---|---|---|
| 358,907 | Whitworth | Mar. 8, 1887 |
| 952,051 | Sowash et al. | Mar. 15, 1910 |
| 987,804 | Howard | Mar. 28, 1911 |
| 1,279,516 | Collins | Sept. 24, 1918 |
| 1,719,368 | Hibbets | July 2, 1929 |
| 2,107,875 | Pitney | Feb. 8, 1938 |
| 2,793,542 | Hirschkorn | May 28, 1957 |